United States Patent [19]
Engelke

[11] Patent Number: 5,909,482
[45] Date of Patent: Jun. 1, 1999

[54] RELAY FOR PERSONAL INTERPRETER

[75] Inventor: Robert M. Engelke, Madison, Wis.

[73] Assignee: Ultratec, Inc., Madison, Wis.

[21] Appl. No.: 08/925,558

[22] Filed: Sep. 8, 1997

[51] Int. Cl.⁶ .......................... H04M 11/00; H04M 1/64
[52] U.S. Cl. ...................... 379/52; 379/88.14; 379/93.15
[58] Field of Search .................................. 379/52, 88.14, 379/93.05, 93.09, 93.14, 93.15; 340/825.19; 704/235, 246, 270, 271

[56] References Cited

U.S. PATENT DOCUMENTS 5,163,081  11/1992  Wycherley et al. ...................... 379/52
5,289,523  2/1994  Vasile et al. ........................... 379/88.14

*Primary Examiner*—Curtis A. Kuntz
*Assistant Examiner*—George Eng
*Attorney, Agent, or Firm*—Quarles & Brady LLP

[57] ABSTRACT

A relay is described to facilitate communication through the telephone system between deaf people and hearing people. To overcome the speed limitations inherent in typing, the call assistant at the relay does not type most words but, instead, re-voices the words spoken by the hearing person into a computer operating a voice recognition software package trained to the voice of that call assistant. The conversation-type flow of communications achieved by this type of relay enables the design of a new class of interpreters for the deaf.

15 Claims, 2 Drawing Sheets

RELAY FOR PERSONAL INTERPRETER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the general field of telephone communications. In more particular, the invention relates to systems to assist telephone communications by those persons who are deaf, hard of hearing, or otherwise have impaired hearing capability.

Most modern human communications in both social and business environments takes place through sound communications. Yet within modern society there are many persons who have attenuated hearing capability. To assist those persons in making use of our telephonic communication system built for the hearing majority, there has been developed a system of telephone communication which has been principally used by the deaf community. That system makes use of a category of device known variously as a telecommunication device for the deaf (TDD), text telephone (TT) or teletype (TTY). Current TDDs are electronic devices consisting of a key board and a display as well as a specific type of modem, to acoustically or directly couple to the telephone line. Modern TDDs permit the user to type characters into their keyboard, with the character strings then encoded and transmitted over the telephone line to be displayed on the display of a communicating or remote TDD device.

Most TDD communication is conducted in an idiosyncratic code specific to the community of TDD users. This code, known as Baudot, evolved historically at a time when many telecommunication devices for the deaf were based on mechanical or electromechanical devices rather than the current technology based on digital electronic components. Accordingly, the Baudot protocol was constructed for a set of constraints which are no longer relevant to present date devices. The original Baudot protocol was a unidirectional or simplex system of communication conducted at 45.5 Baud. The conventional Baudot character set was a character set consisting of 5 bit characters and the system encodes the bits of those characters in a two-tonal system based on carrier tones of 1400 and 1800 Hertz.

The system of TDD communications is widely used and in fact has become indispensable to the deaf community throughout the industrialized world. Deaf persons extensively communicate with their neighbors and with other deaf and hearing people remotely, using the TDD system. In addition, systems have been developed to facilitate the exchange of communication between the deaf community and hearing users who do not have access to or utilize a TDD device. In the United States, telephone companies have set up a service referred to as a "relay." A relay, as the term is used herein, refers to a system of voice to TDD communication in which an operator, referred to as a "call assistant," serves as a human intermediary between a hearing user and a deaf person. Normally the call assistant wears a headset that communicates by voice with the hearing user and also has access to a TDD device which can communicate to the deaf user using a TDD appropriate protocol. In normal relay operations in the prior art, the call assistant types at a TDD keyboard the words which are voiced to her by the hearing user and then voices to the hearing user the words that the call assistant sees upon the display of his or her TDD. The call assistant serves, in essence, as an interpreting intermediary between the deaf person and the hearing person to translate from voice to digital electronic forms of communication.

A limitation in the effectiveness of current relay protocols is the necessity for the call assistant simply to type what is said. Typical call assistants can usually type reasonably well, typically in the range of 30 to 50 words per minute. While systems exist which permit the digital encoding of verbal communications at a faster rate, such as court stenography used in the legal system, such systems require extensive special training and are impractical for the numerous call assistants required by the relay systems in operation today. This limitation on the speed of conversion from speech to digital communications hampers the effective flow of communication in a relay call between the hearing person and a deaf person, since most hearing people speak at a rate which is higher than most call assistants can type. In addition, since conventional Baudot communications is unidirectional, the flow of conversation in a relay assisted communication session can be somewhat awkward. For example, first the hearing person must voice a statement or question. Then the calling assistant must type that statement or question, which is then transmitted at Baudot speeds, which are slower than normal human voice communication, to the deaf person. The deaf person waits until the entire statement or question is transmitted to him or her, after which he or she composes a response and types it in at his or her TDD. Then the communication flows backward to the call assistant who must voice to the hearing person what the deaf person has typed at his or her terminal. This process enables a degree of two-way communication between a deaf person and a hearing person, but the system tries the patience of the hearing person, since it is typically not conducted at a pace anywhere close to normal human communications.

BRIEF SUMMARY OF THE INVENTION

The present invention is summarized in that a relay system to facilitate the translation of information and communication between deaf and hearing persons includes a call assistant who re-voices the words of the hearing person which are spoken to the call assistant. The words spoken by the call assistant are recognized by a speech recognition computer program which has been trained to the voice pattern of the call assistant, such that the words are promptly translated into a high speed digital communication protocol. That high speed digital communication message is then transmitted electronically promptly by telephone to a visual display accessible to the deaf person.

It is an advantage of the invention described herein that the call assistant does not have to type most, if any, of the words spoken by the hearing person in the communication session so that the overall speed of communications from the hearing person to the deaf person is dramatically increased.

It is an object of the present invention that the design and utilization of a relay operated in accordance with the protocols described herein permits the introduction of small hand-held personal interpreter which will enable on the spot communications between deaf persons and hearing persons wherever the deaf persons might go.

Other objects, advantages and features of the present invention will become apparent from the following specification when taken in conjunction with the accompanying drawings.

DETAILED DESCRIPTION OF THE INVENTION

The present invention is directed toward a relay system, and a method for operating a relay system, so as to provide more conversation-like performance of voice to text interpreting for translating between deaf and hearing users. The improvements to the relay system and method of operating the relay described herein are applicable to the broad TDD community and to all the applications in which a relay is normally used. However, since the advantages of this system are most clear in view of its usefulness in enabling the advent of the truly portable personal interpreter for the deaf, a brief diversion to discuss what this device is and how the relay may enable its practical use is appropriate here.

Figure 2:
FIG. 2 is an exterior view of a personal interpreter enabled by the relay of FIG. 1.

Shown in FIG. 2 is an illustration of what a personal interpreter 10 can look like. This would be a small hand held device typically the size of a small hardbound book. It would have a keyboard of minimal size, but useable by a deaf person who can type. It would have a two to four line display, but the display could be any size that conveniently fits in the case of the device. The device would also have a key or switch which would initiate its operation.

Shown in FIG. 2 is a schematic block diagram of the internal mechanics of the personal interpreter. The personal interpreter keyboard shown at 12 and its display as shown at 14. Inside the interpreter itself is a microprocessor shown at 16. Not shown, but included within the personal interpreter, would be the appropriate memory and interface devices so as to allow the microprocessor to be programmed and to operate the personal interpreter and perform its functions, in a manner well known in the art. Also inside of the personal interpreter is a modem 18. The modem 18 is preferably a modem specifically designed for interface with the deaf telecommunications system. Most telecommunications with the deaf community are conducted using a Baudot type code. It is preferred that the mode be designed to use the enhanced form of Baudot communication known as "Turbo Code" (Ultratec), which is generally described in U.S. Pat. Nos. 5,432,837, No. 5,517,548, and 5,327,479, the disclosure of which is hereby incorporated by reference. It is even more preferred that the modem use a new variant of Turbo Code, one which uses higher carrier frequencies (in the range of 3000–3500 hertz) and a faster baud rate (over 100 baud). The output of the modem is preferably wired to a cellular telephone 20 included within the case of the personal interpreter 10. The cellular telephone 20 has a suitable antenna provided on it so that it may dial a cellular telephone network by radio frequency communications of the type normally conducted by cellular telephones. The personal interpreter also includes jack 28 to connect to a conventional wired or land-line telephone line as well. The personal interpreter also include a microphone 22 and a speaker 24. A filter 26 connects the speaker 24 and the microphone 22 to the telephone 20.

A brief description of the operation and functionality of the personal interpreter reveals the dramatic improvement and convenience and portability that this device gives to deaf people. A deaf user could go into an establishment, be it a government office or retail facility, in which there are only hearing persons. The deaf person would carry with him or her the personal interpreter 10. The deaf person would then place the personal interpreter 10 upon a counter or other surface, open it up, and press the initiation key or start button. The microprocessor 16 and modem 18 of the personal interpreter then power up and act in many ways like a normal TDD device operating in telecommunication standard, such as Turbo Code. However, there is one critical difference. The start or initiation key further causes the microprocessor 16 of the personal interpreter to dial a relay to set up a relay communication session and includes in its communication with the relay a message, using the enhanced command features available in advanced telecommunication protocols, such as Turbo Code, to initiate a special format of relay call adapted for the personal interpreter. Other codes which permit command functions, such as ASCII or CCITT, could also be used. The first operation is to activate the cellular telephone and direct the cellular telephone to dial the number of a relay operating in accordance with the method of the present invention. The cellular telephone dials the relay. Obviously, no wired connection is required to allow the cellular telephone function to establish a telephone connection with the remote relay, but alternatively the jack 28 to a conventional telephone line could be used. In addition, when the relay answers the telephone connection, the microprocessor 18 of the personal interpreter 10 is instructed to provide command codes to the remote relay. These command codes, a feature possible through the use of Turbo Code, permits the personal interpreter to tell the relay that this is a personal interpreter-type relay communication session. All of this can happen in the time necessary to initiate the cellular call, perhaps two to ten seconds.

Then, the deaf person can use the personal interpreter to translate words spoken by hearing persons in the presence of the personal interpreter into visually readable text. This is done by the personal interpreter 10 through an unseen relay. Words spoken by the hearing persons in the presence of the personal interpreter 10 are picked up by the microphone 22. Those words are then transmitted through the cellular telephone 20 to the remote relay. The relay, operating as will be described below, then immediately transmits back, in enhanced Turbo Code, a digital communication stream translating the words that were just spoken. The words are received by the modem 18, and the microprocessor 16 in the personal interpreter 10, and it is displayed promptly upon the display screen 14. If the deaf person can speak, he or she may then answer the hearing person with a spoken voice, or, the deaf person may alternatively type upon the keyboard 12. If the deaf user types on the keyboard 12, the personal interpreter transmits the communication by digital communication to the relay. The call assistant at the relay then reads and speaks the words typed by the deaf user which are transmitted to the speaker 22 contained in the personal interpreter into a voice communication which can be understood by the hearing users. The filter 26 filters out the digital communication frequencies from the sound generated by the speaker 22. Thus, in essence, the deaf person has a personal interpreter available to him or her at all times of the day or night wherever the deaf person is within the range of the cellular telephone system. Also, because the relay is preferably operating in accordance with the fast translation methodology described below, a very conversation-like feel can occur in the communication session between the deaf user and the hearing persons in the presence of the personal interpreter 10. In order for this communication session to be satisfactory to the hearing users as well as the deaf person, however, the relay must operate exceedingly rapidly. It is, in part, to meet the need for the exceeding rapidity of this conversational style of communication that the relay protocol of the present invention has been designed.

Figure 1:
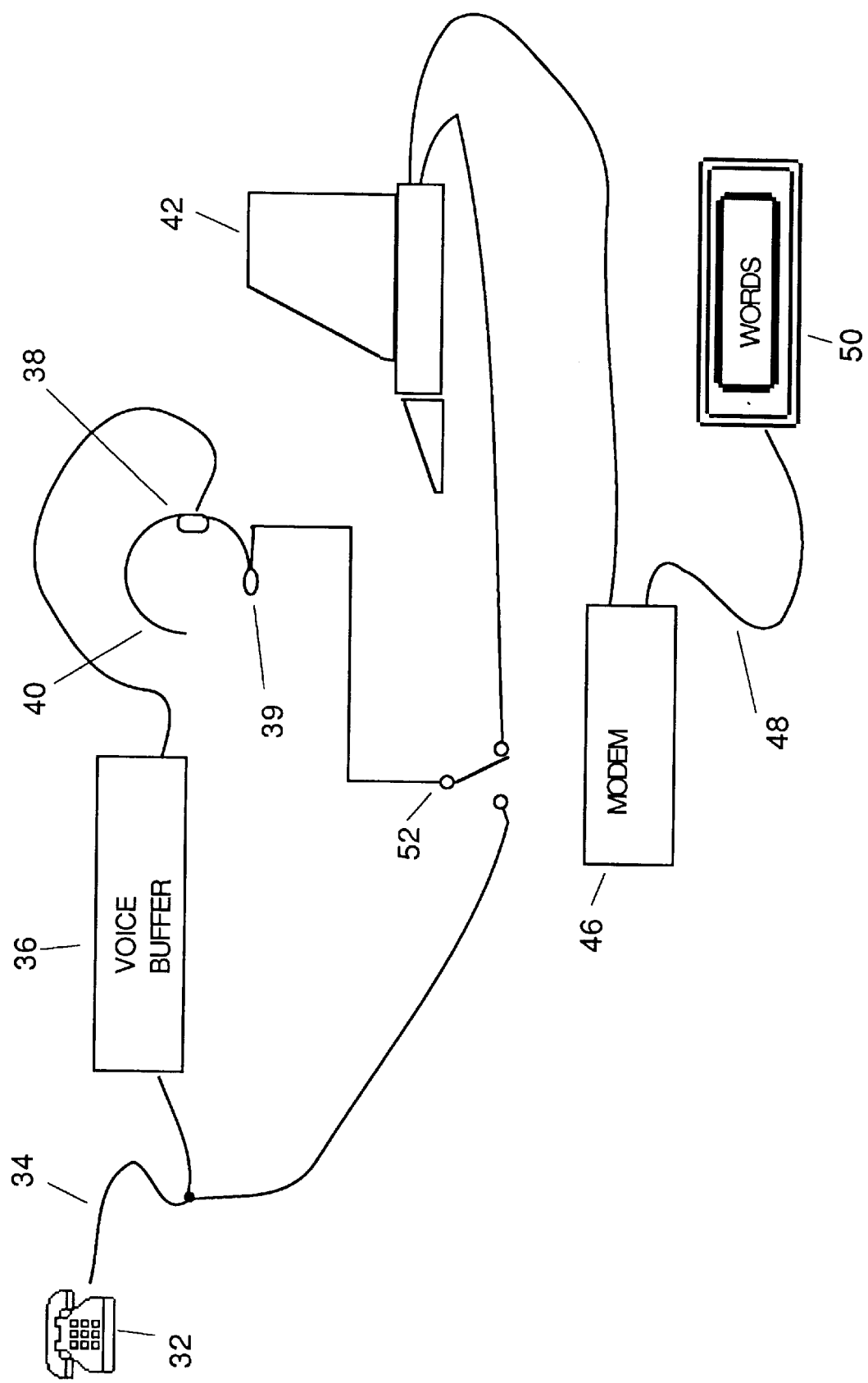
FIG. 1 is a schematic block diagram of a relay operated in accordance with the present invention.

Shown in FIG. 1 is a relay intended to provide that capability. FIG. 1 is intended to show, in schematic fashion, how such a relay system can be set up. Shown at 32 is a telephone of a speaking person. Instead of a telephone of a speaking person, the input could also be the microphone of the personal translator 10 shown in FIGS. 2 and 3. The telephone of the speaking person 32 is connected through a telephone line 34 to a voice input buffer 36 at the relay. The telephone line 34 can be an actual physical land line, or two pair between the telephones, or can be a cellular or other over-the-air telephone linkage. The voice input buffer 36 is a simple buffer to ensure temporary capture of the voice in the event that the call assistant gets behind and needs to buffer or delay the voice of the speaking person. In any event, the output of the input voice buffer 36 is provided to a headset 40 where earphones 38 produce the sound of the remote speaking person in the ear of the call assistant. The call assistant is wearing the headset 40 and sitting at a computer 42 capable of communicating in an enhanced Baudot communication, such as Turbo Code or whatever other code protocol is being used. However, typically the call assistant does not type the words which the call assistant hears in his or her earphone 38. Instead, the call assistant then speaks the words which he or she hears in the earphones 38 into a microphone 39 in the headset 40. The microphone 39 on the headset 40 is connected to transmit the voice of the call assistant to the computer 42 at which the call assistant sits.

The computer 42 has been provided with a voice recognition software package which can recognize the spoken voice of the call assistant and immediately translate words spoken in that voice into a digital text communication stream. It is a limitation of currently available speech recognition software that the software must be trained or adapted to a particular user, before it can accurately transcribe what words the user speaks. Accordingly, it is envisioned here that the call assistant operates at a computer terminal which contains a copy of a voice recognition software package which is specifically trained to the voice of that particular call assistant. It is also important that the voice recognition system be capable of transcribing the words of the voice of the call assistant at the speed of a normal human communication. It has been found that a recently available commercial voice recognition package from Dragon Systems, known as "Naturally Speaking," is a voice recognition software which will accomplish this objective and which will translate to digital text spoken words of a user at the normal speeds of human communication in conversation when operating on conventional modern personal computers.

The computer terminal 42 of the call assistant then translates the text created by the voice recognition software to a modem 46 out through a telephone line 48 back to the display 50 located adjacent to the deaf person. The display 50 can be a conventional TDD located at the home of the remote deaf user, or can be the display 14 of the personal interpreter 10.

For reasons that will become apparent, there is also a connection from the microphone 39 of the headset 40 of the call assistant to the incoming telephone line 34 through a switch 52. The switch 52 can physically be an electrical switch located between the microphone 39 and the telephone lines 34 and the computer 42 or, as an alternative, it can be a software switch operating in the computer 42 which passes the voice of the user through to the telephone lines as voice, or not, under conditions which are selected by the call assistant, by choices he or she makes at the keyboard 44 of the computer 42. The switch 52 is functionally a single pole double throw switch although, of course, if this function is performed by the computer it will be a logical not a physical switch. In the simplest embodiment, the switch 52 is a simple single pole dual throw foot switch readily accessible to the call assistant which passes the voice of the call assistant from the microphone either out onto the telephone line 34 or to the computer 42.

It is a further enhancement to the operation of the relay constructed in accordance with the present invention that the earphones 38 have noise attenuating capability. Noise canceling earphones are commercially available today or, for this purpose, the computer 42 can be provided with noise canceling sound generation software which would create sound transmitted to the earphone 38 so as to cancel the sounds of the call assistant's own voice. The noise attenuation or cancellation avoids distracting the call assistant, since he or she would then be less distracted by the words that he or she has spoken, and thus would be less likely to be distracted from the concentration of the task of re-voicing the sounds of the voice heard in the call assistant's ear.

Similarly, another option which would be advantageous is that the software providing for the creation of the digital text string by voice recognition be buffered in its output flow to the modem 46. Before the computer 42 would pass the data on to the modem 46, the data would first be displayed on the computer screen of the computer 42 for review by the call assistant. The purpose of this option would be to permit the call assistant to use the keyboard to spell or correct hard-to-spell words, or to create corrections of any misinterpretations created by the voice recognition software, from the words spoken by the call assistant. It is anticipated that if such an option is utilized, it would require fairly infrequent use of the keyboard by the call assistant, since frequent use would clearly slow down the through-put of the communications.

Figure 3:
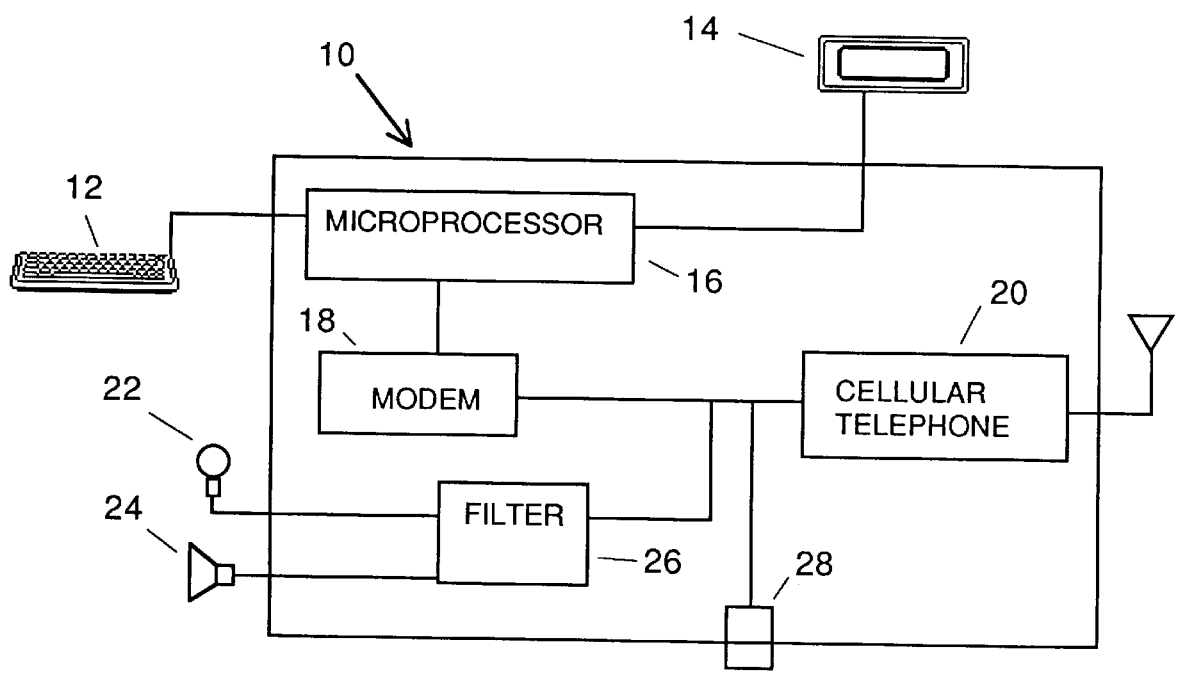
FIG. 3 is a schematic block diagram of the personal interpreter of FIG. 2.

The relay of FIG. 1 can operate with normal TDDs or with a personal interpreter as shown in FIGS. 2 and 3. In either event, the hearing person speaks in the telephone 32 and the words are transmitted through the telephone line 34 to the voice buffer 36. The voice buffer 36, again operating under the control of the call assistant, would buffer the voice signals from the hearing user as needed for the call assistant to keep up. The call assistant would hear the voice of the hearing user through the earpiece 38 and then would re-voice those same words into the microphone 39. The words that the user speaks into the microphone 39 would be fed to the computer 42 where the voice recognition software, trained to the voice of the call assistant, would translate those words into a digital text stream. The digital text stream would be turned into a digital communication stream by the modem 46 and passed on the telephone line 48 to a display 50 which can be observed by the deaf user. Experience has shown that using currently available technology the delay between the time the hearing user speaks into the telephone 32 and the time the words appear on the display 50 of the deaf user is a modest number of seconds.

In the reverse, when the deaf user types onto his or her telecommunication device, the digital signals are transmitted to the computer 42 which displays them for the call assistant who then voices those words into the microphone 39 which words are then transmitted onto the telephone line 34. Note that the presence of the switch 52 is therefore important in this mode. Since the voice of the call assistant serves two different functions in the operation of this system, the signal on the call assistant's voice must be switched so that the hearing user 32 only hears the voice for the communications which are intended to be directed to that person. The switch 52 allows for the voice of the call assistant only to be directed to the hearing person at the appropriate times.

Note that if the relay of FIG. 1 is used to facilitate a translation based on a personal interpreter such as that shown in FIGS. 2 and 3, there will be only one telephone line between the personal interpreter and the call assistant. In essence, in a modification of FIG. 1, the telephone 32 and the display 50 would both be within the personal interpreter 10. There would be only one telephone line, a cellular link, between the personal interpreter 10 and the call assistant. Note, therefore, that the voice of the call assistant and the digital communications created by the computer 42 would then travel on that same telephone linkage to and from the personal interpreter 10. It is therefore important for this embodiment that the personal interpreter 10 have appropriate filtering (i.e. the filter 26) to filter out the digital communication carrier frequencies of the digital communication protocol, so that they are not heard by hearing listeners in the presence of the personal interpreter 10. The telephone line must still carry voice signals, however, so that the spoken words articulated by the call assistant in response to digital instructions from the deaf user can be properly broadcast by the speaker contained within the personal interpreter.

The provision for filtering of the digital frequencies can be done in any number of ways with two being the principal preferred methodologies. If Turbo Baudot communications are conducted at the conventional Baudot frequencies of 1400 and 1800 Hertz, the personal interpreter 10 could be provided with notch filters 26 to filter out signals at those particular frequencies. It has been found that such notch filters still permit the transmission of audible and understandable human speech, even if they filter at those particular frequencies. As an alternative, it is possible to change the Baudot frequencies to those which are much higher, such as frequencies of 3000 to 3500 Hertz. If this alternative is selected, the personal interpreter 10 is then provided with a low pass filter which permits low frequency sounds to go to the speaker to be broadcast into the environment of the personal interpreter, while high frequencies are excluded.

It has been found in actual human tests that utilizing the revoicing methodology combined with speech recognition by the call assistant results in a through put of communication two to four times faster than the typing which can be achieved by a normal call assistant operating a keyboard. This is a dramatic improvement in the social acceptability of deaf to hearing person translation systems. While deaf users are accustomed to the delays inherent in TDD communications, hearing users are not. The provision for the faster throughput through a relay system such as provided by the relay of FIG. 1 allows for more conversation-like interchange between deaf persons and hearing persons than was heretofore possible. The relay of FIG. 1 also enables, for the first time, a personal interpreter of the type illustrated at 10 in FIGS. 2 and 3 to be available to deaf users who can then get on the spot interpreting virtually anywhere. This offers a freedom and functionality to deaf users which was not heretofore possible in the art.

It is to be understood that the present invention is not limited to the particular illustrations and embodiments disclosed above, but embraces all such modified forms thereof as come within the scope of the following claims.

I claim:

1. A method of operating a relay system using a call assistant to facilitate communication between a deaf person and a hearing person by telephone comprising the steps of transmitting the voice of the hearing person when speaking to the ear of the call assistant;

the call assistant speaking in voice the same words that the call assistant hears spoken by the hearing person into a microphone connected to a digital computer;

the digital computer using voice recognition computer software trained to the voice of the call assistant to translate the words of the voice spoken by the call assistant into a digital text message stream containing the words spoken by the call assistant;

transmitting the digital text message stream created by the computer by telephone connection to a telecommunication device within sight of the deaf person; and the telecommunication device displaying in visually readable text the words in the digital text message stream.

2. A method as claimed in claim 1 further comprising the step of using the voice spoken by the call assistant to create a noise canceling signal also transmitted to the earphone of the call assistant so that the call assistant hears less of his or her own spoken voice.

3. A method as claimed in claim 1 further comprising a switch to switch the relay between one mode in which the voice of the call assistant is transmitted to the computer and another mode in which the voice of the call assistant is not transmitted to the computer but is instead transmitted over the telephone system to the hearing person.

4. A method as claimed in claim 1 further comprising the step of buffering the voice of the hearing person between the telephone system and the earphone of the call assistant selectively under the control of the call assistant.

5. A method as claimed in claim 1 wherein there are separate telephone lines of the telephone system used for communicate between the call assistant and the hearing person and the call assistant and the deaf person.

6. A method as claimed in claim 1 wherein there is a single telephone line of the telephone system used to communication between the call assistant and the hearing person and the call assistant and the deaf person, the digital text message stream and the voice of the hearing person both being transmitted over that single telephone line.

7. A relay to facilitate communication between a deaf person using a telecommunication device for the deaf and a hearing person through a telephone system and using a call assistant, the relay comprising a speaker connected to receive voice communications from the telephone system and transmit those voice communications to the ear of the call assistant;

a microphone connected to pickup voice spoken by the call assistant;

a digital computer connected to the microphone, the computer programmed to use a voice recognition computer software package trained to the voice of the call assistant to translate the words spoken in voice by the call assistant into a digital text stream;

a modem to transit the digital text stream created by the computer over the telephone system to the telecommunication device for the deaf of the deaf person; and noise attenuating means responsive to the voice spoken by the call assistant and connected to the speaker to attenuate the noise of the voice of the call assistant from the sounds heard in the ear of the call assistant.

8. A relay as claimed in claim 7 wherein there are separate telephone lines of the telephone system connected between the call assistant and the hearing person and the call assistant and the deaf person.

9. A method as claimed in claim 7 wherein there is a single telephone line of the telephone system used to communicate between the call assistant and the hearing person and the call assistant and the deaf person, the digital text message stream and the voice of the hearing person both being transmitted over that single telephone line.

10. A relay to facilitate communication between a deaf person using a telecommunication device for the deaf and a hearing person through a telephone system, the relay operated by a call assistant, the relay comprising a speaker connected to receive voice communications from the telephone system and transmit those voice communications to the ear of the call assistant;

a microphone connected to pickup voice spoken by the call assistant;

a digital computer connected to the microphone, the computer programmed to use a voice recognition computer software package trained to the voice of the call assistant to translate the words spoken in voice by the call assistant into a digital text stream;

a modem to transit the digital text stream created by the computer over the telephone system to the telecommunication device for the deaf of the deaf person; and a switch to alternatively connect the voice of the call assistant to the computer or to the telephone system for transmission to the hearing person.

11. A relay as claimed in claim 10 wherein there are separate telephone lines of the telephone system connected between the call assistant and the hearing person and the call assistant and the deaf person.

12. A method as claimed in claim 10 wherein there is a single telephone line of the telephone system used to communicate between the call assistant and the hearing person and the call assistant and the deaf person, the digital text message stream and the voice of the hearing person both being transmitted over that single telephone line.

13. A relay to facilitate communication between a deaf person using a telecommunication device for the deaf and a hearing person through a telephone system, the relay operated by a call assistant, the relay comprising a earphone connected to receive voice communications from the telephone system and transmit those voice communications to the ear of the call assistant;

a microphone connected to pickup voice spoken by the call assistant;

a digital computer connected to the microphone, the computer programmed to use a voice recognition computer software package trained to the voice of the call assistant to translate the words spoken in voice by the call assistant into a digital text stream;

a modem to transit the digital text stream created by the computer over the telephone system to the telecommunication device for the deaf of the deaf person; and a voice buffer connected between the telephone system and the earphone of the call assistant, the voice buffer being controlled by the call assistant, so that the voice assistant can buffer the voice of the hearing user between the telephone system and the ear of the call assistant.

14. A relay as claimed in claim 13 wherein there are separate telephone lines of the telephone system connected between the call assistant and the hearing person and the call assistant and the deaf person.

15. A method as claimed in claim 13 wherein there is a single telephone line of the telephone system used to communicate between the call assistant and the hearing person and the call assistant and the deaf person, the digital text message stream and the voice of the hearing person both being transmitted over that single telephone line.

* * * * *